Feb. 4, 1958 A. BOSCHI 2,822,165

SPRINGS

Filed Dec. 1, 1953

INVENTOR
ANTONIO BOSCHI

BY *Stone, Boyden & Mack*
ATTORNEYS.

United States Patent Office 2,822,165
Patented Feb. 4, 1958

2,822,165

SPRINGS

Antonio Boschi, Milan, Italy, assignor to Società Applicazioni Gomma Antivibranti S. A. G. A. Società per Azioni, Milan, Italy Application December 1, 1953, Serial No. 395,571

Claims priority, application Italy December 11, 1952

3 Claims. (Cl. 267—33)

This invention pertains to spring for supporting mobile machines (e. g. railway vehicles, motor cars, and elastically suspended motors), and more particularly has reference to such springs comprising rubber working chiefly under compression, with or without the insertion of metallic helicoidal springs operating in parallel therewith.

Owing to the limited space available for the accommodation of springs, especially in vehicles, it is highly desirable that such springs fulfil the following conditions:

(1) Have a minimum lateral deformation under load;
(2) Obtain a stiffness which increases with the load;
(3) Distribute the load between rubber and metal elements of composite springs, in each case in the most suitable proportion, with respect to the hysteresis and temporary variations in the characteristics of the rubber and metal elements.
(4) Ensure the stability of the spring, especially where its form factors are unfavorable, and its terminal bearings are not parallel and of the same design.

It is known that when a rubber body (e. g. a cylinder) is compressed under load, it undergoes a lateral deformation (bulging), depending upon the amount of axial compression, in accordance with the law of elastic behavior of rubber columns under load. Such lateral deformation depends largely upon the form factors of the rubber body which, in the case of a cylindrical column, are the ratio of its length to its diameter and cross-sectional area. The greater that ratio, the more unfavorable are the form factors and the greater the susceptibility of the rubber cylinder to lateral bending and instability under load. Owing to unfavorable form factors, prior art rubber springs in current appliances, generally showed lateral deformations (bending and bulging) in excess of the space available for the spring. In order to avoid this difficulty, such springs have been subdivided into several component springs, each having more favorable form factors, and being superimposed, with separation of component springs by rigid, generally metallic insertions. While this system was an improvement over the monolithic spring, it has the great disadvantage of considerable complication in the manufacture and assembly of the spring because of the multiplicity of its constituent pieces.

The principal object of this invention is to provide an improved spring comprising a one-piece rubber cylinder, with or without a reinforcing metal spring, which retains the simplicity and economy of monolithic structure and also more effectively meets the requirements mentioned above.

A further object of my invention is to provide such a rubber spring which is so constructed and arranged as to limit the thickness of the zone subjected initially to axial compression under load and which comprises parts suitably shaped so as to gradually and successively contact each other as the spring is compressed under load, and also provide spaces into which the rubber can expand, without materially increasing the outside lateral dimensions of the spring.

Another object is to provide such a spring, with a helical metal reinforcing spring, in which the parallel strata of both rubber and metal elements maintain their parallelism during compression of the composite spring under load, thereby eliminating the tendency of the rubber strata to slope or cant with a fatigue stress that lessens the durability of the spring.

Still another object is to provide such a composite spring in which the stresses are distributed in the most suitable manner to obtain optimum hysteresis and reduce the influence of the plastic deformation of the rubber of the composite spring.

A still further object is to provide such a composite spring in which the metal element is incorporated in the rubber in a zone which, owing to its location and shape, shows little or no deformation, when the composite spring is compressed, and hence there are no slopes between the rubber and metal elements, or such slopes and their consequent stresses are reduced to a minimum.

With these and other objects in view which may be incident to my improvements, my invention consists of the combination and arrangement of elements hereinafter described and illustrated in the accompanying drawing, in which.

In all the figures of the drawing, the same reference numerals denote corresponding parts.

Figure 1:
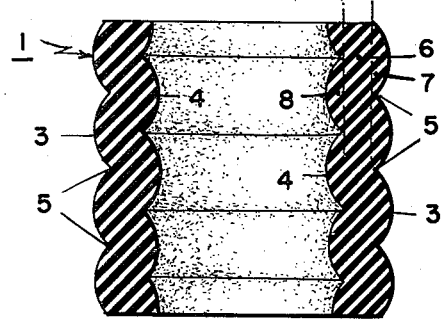
Fig. 1 is a central, vertical section of an unreinforced rubber spring, according to my invention, having layers parallel with its ends.

Referring first to Fig. 1, it will be noted that this spring comprises a single piece of rubber, molded in the form of a circular cylinder, of which the walls 1 consist of a series of superimposed layers having contoured inner and outer surfaces 3 and 4, arranged in staggered relation to each other, so as to provide troughs 5 between each adjacent pair of layers. These contoured inner and outer surfaces are so shaped and spaced, relative to each other, as to provide a central cylindrical zone 6, between the vertically aligned troughs 5, which is initially and progressively stressed in compression at a uniform rate, as the load on the spring increases; while the zones 7 and 8 (on either side of zone 6) are successively stressed in compression, with increasing deformation of the spring under increasing load, as their adjacent surfaces are thus brought gradually into contact.

The successive deformation of zones 7 and 8 correspondingly increases the area of the compressed rubber, and consequently the stiffness of the spring, as the load increases, fulfilling the second condition mentioned above. At the same time, the trough 5 provide spaces into which the adjacent portions 3 and 4 can expand when compressed under load. This prevents the tendency of the walls 1 to bulge outwardly under load, so that the overall lateral dimensions of the spring are not appreciably increased, even under maximum load. My improved spring thus fulfills the first condition mentioned above, and it can therefore be accommodated in a smaller space than prior art rubber springs carrying the same loads.

The contoured surfaces 3 and 4 of zones 7 and 8 may be made with different curvatures; and by suitably limiting the width of zone 6, the stresses in walls 1, during compression of the spring are distributed throughout the mass of rubber in the most suitable manner.

Figure 2:
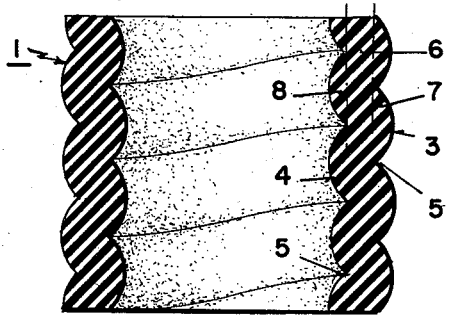
Fig. 2 shows a modification of the spring of Fig. 1, wherein the layers are in the form of a helix.

The spring shown in Fig. 2 is similar to that of Fig. 1 except that in the former the walls 1 are in the form of a cylindrical helix, instead of parallel layers, as in the latter. The form shown in Fig. 2 has the advantage that in manufacture it is easier to extract from the mold as in Fig. 1, the portions 7 and 8 of walls 1 of Fig. 2 may be of different radial thickness and differently shaped, so as to give a reaction under load, equal or different, as required for different sections and form factors of the particular spring.

Figure 3:
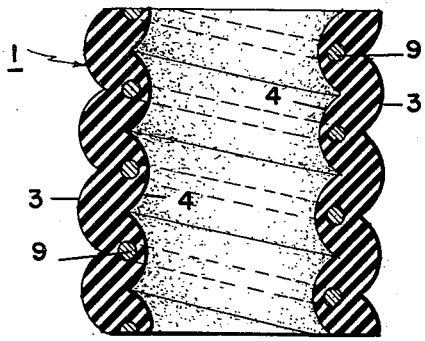
Fig. 3 shows a rubber spring similar to that of Fig. 2, except that the former is reinforced by a helical metal spring.

The spring shown in Fig. 3 is the same as that of Fig. 2 except that in the former the rubber spring is reinforced by a helical, metal spring 9 which is embedded in portions 4 of walls 1. The spring 9 is located in portions 4 because these portions, owing to their special shape and location in walls 1, show no deformation when the spring is compressed, so that slopes between the rubber and metal strata are either eliminated, or reduced to a minimum, and consequently, the stresses between the adhering rubber and metal elements are correspondingly eliminated or reduced to a minimum.

By locating the spring 9 in the inner portions 4 of walls 1, the stresses that tend to deform the rubber in an outward radial direction are balanced by the tangential stresses developed by said radial deformation. I thus obtain a composite spring wherein the imposed load is distributed between the rubber and metal elements proportionally to the characteristics of single springs. It is, therefore, possible by suitably diminishing the rubber and metal elements, to distribute the imposed load between certain limits, in order to obtain in the composite system the most suitable hysteresis, and to reduce the influence of the plastic deformation of the rubber element. The incorporation of the metal spring in the manner described also causes the composite spring to resist lateral bulging or bending under load, and hence the composite spring fulfills the third or fourth conditions mentioned above.

Figure 4:
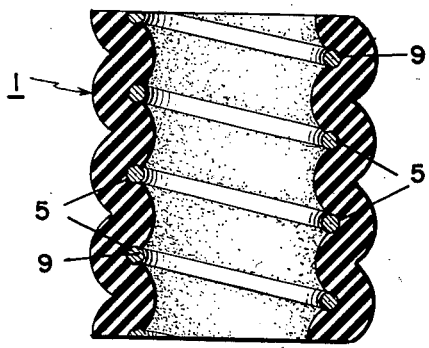
Fig. 4 shows another modification of the spring of Fig. 3, wherein the reinforcing, metal spring is positioned in the troughs between adjacent convolutions on the inner surface of the rubber spring.

The spring shown in Fig. 4 is similar to that shown in Fig. 3, except that in the former, the metal spring 9 is located in the helical groove 5 on the inner surface of walls 1, instead of being embedded in said walls. This construction has the advantage of simpler manufacture, in that the spring 9 can either be inserted in the rubber spring 1 after the latter is molded, or spring 9 can be wound upon the core of the mold before the rubber stock is placed in the mold.

Figure 5:
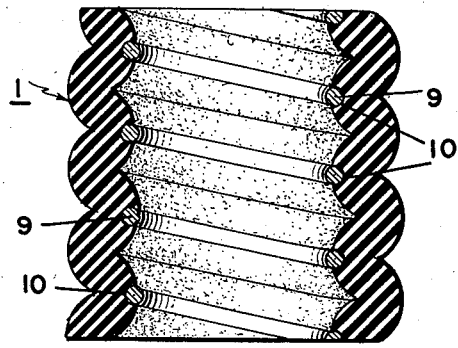
Fig. 5 shows a modification of the spring of Fig. 5, wherein the reinforcing, metal spring is positoned in a helical groove in the apexes of the convolutions of the rubber spring.

The spring shown in Fig. 5 is similar to that of Fig. 4, except that in the former, the rubber spring 9 is located in a helical groove 10 in the apexes of portions 8 of walls 1.

While I have shown and described the preferred embodiments of my invention, I do not limit myself to the precise details of construction and arrangement disclosed by way of illustration, as these may be changed and modified by those skilled in the art without departing from the spirit of my invention or departing from the spirit of the appended claims.

I claim:

1. A spring comprising a unitary rubber body of generally cylindrical form, the inner and outer surfaces of said body each comprising adjacent outwardly bulged rib-like portions, each rib-like portion having an outer face which in cross section is substantially an arc of a circle and the arcs of the successive ribs meeting in vertices, the rib-like portions of one of said surfaces being staggered axially of the body with respect to the rib-like portions of the other surface in such manner that the edges of the rib-like portions of one surface lie opposite the medial portions of the rib-like portions of the other surface, said body being of such thickness as to provide between the inner and outer apices an intermediate cylindrical mass of rubber of substantial thickness which mass is progressively stressed in compression under increasing axial load on the spring, said rib-like portions constituting masses of rubber whose convex surfaces are brought into progressively increasing contact with each other from said apices as said intermediate cylindrical mass is so progressively stressed in compression, whereby the stiffness of the spring is progressively increased as the axial load increases.

2. A spring constructed in accordance with claim 1 wherein said rib-like portions are disposed helically about the axis of the spring, and said spring further including a helical metal spring embedded in the rib-like portion at the inner surface of said body.

3. A spring constructed in accordance with claim 1, wherein said rib-like portions are disposed helically about the axis of the spring, and said spring further including a helical metal spring disposed within said body and lying in the helical valley between adjacent turns of the helical rib portion of the inner surface of said body.

References Cited in the file of this patent

UNITED STATES PATENTS

| | | |
|---|---|---|
| 84,258 | Bussell | Nov. 24, 1868 |
| 168,846 | Pratt | Oct. 19, 1875 |
| 170,590 | Pratt | Nov. 30, 1875 |
| 1,032,454 | Wainwright | July 16, 1912 |
| 2,605,099 | Brown | July 29, 1952 |

FOREIGN PATENTS

| | | |
|---|---|---|
| 2,829 | Great Britain | of 1870 |
| 698,322 | Great Britain | Oct. 14, 1953 |